(12) United States Patent
Wilson

(10) Patent No.: US 11,176,785 B1
(45) Date of Patent: Nov. 16, 2021

(54) DETECTION OF DISPENSING ERRORS IN AUTOMATED TELLER MACHINES

(71) Applicant: Bank of America Corporation, Charlotte, NC (US)

(72) Inventor: Douglas Scott Wilson, Nashua, NH (US)

(73) Assignee: Bank of America Corporation, Charlotte, NC (US)

( * ) Notice: Subject to any disclaimer, the term of this patent is extended or adjusted under 35 U.S.C. 154(b) by 50 days.

(21) Appl. No.: 16/901,845

(22) Filed: Jun. 15, 2020

(51) Int. Cl.
*G06Q 20/10* (2012.01)
*G07F 19/00* (2006.01)

(52) U.S. Cl.
CPC ....... *G07F 19/206* (2013.01); *G06Q 20/1085* (2013.01)

(58) Field of Classification Search
CPC .......................... G07F 19/206; G06Q 20/1085
See application file for complete search history.

(56) References Cited

U.S. PATENT DOCUMENTS

| | | |
|---|---|---|
| 5,253,167 A | 10/1993 | Yoshida et al. |
| 5,779,379 A | 7/1998 | Mason et al. |
| 6,607,081 B2 | 8/2003 | Graef et al. |
| 6,745,939 B2 | 6/2004 | Force et al. |
| 7,028,888 B2 | 4/2006 | Laskowski |
| 7,093,750 B1 | 8/2006 | Block et al. |
| 7,201,320 B2 | 4/2007 | Csulits et al. |
| 7,230,223 B2 | 6/2007 | Jespersen et al. |
| 7,367,492 B2 | 5/2008 | Shepley et al. |
| 7,513,413 B2 | 4/2009 | Graef et al. |
| 7,600,671 B2 | 10/2009 | Forrest et al. |
| 7,604,164 B2 | 10/2009 | Schlabach et al. |
| 7,617,971 B2 | 11/2009 | Shepley et al. |
| 7,641,107 B1 | 1/2010 | Gill et al. |
| 7,717,331 B2 | 5/2010 | Shepley et al. |
| 7,762,454 B2 | 7/2010 | Block et al. |

(Continued)

FOREIGN PATENT DOCUMENTS

| | | | | |
|---|---|---|---|---|
| WO | WO-2007134418 A1 | * | 11/2007 | ......... G07F 19/2055 |
| WO | WO-2012070326 A1 | * | 5/2012 | ............. G07D 11/22 |

OTHER PUBLICATIONS

Ojha, Sangeeta: Failed ATM Transaction Refund Time: Key Things to Know, Oct. 8, 2020, pp. 1-5 (Year: 2020).*

(Continued)

*Primary Examiner* — Bijendra K Shrestha
(74) *Attorney, Agent, or Firm* — Michael A. Springs

(57) ABSTRACT

A system configured to display questions to a user regarding a transaction at an automated teller machine (ATM). The system is further configured to receive a signal from the user in response to a first question, indicating that the cash dispensed by the ATM does not match the cash the user requested. The system is also configured to receive a signal from the user in response to a second question, indicating that the received amount of cash did not match the requested amount of cash, the received denominations did not match the requested denominations, or both. The system is further configured to generate an error report that includes the information indicated by the signals, a report identifier, and a user identifier. The system generates a receipt for the user that includes the report identifier, and the system sends the report to a server for analysis.

18 Claims, 3 Drawing Sheets

(56) References Cited

U.S. PATENT DOCUMENTS

| | | |
|---|---|---|
| 7,870,996 B1 | 1/2011 | Graef et al. |
| 7,891,554 B2 | 2/2011 | Graef et al. |
| 7,959,072 B1 | 6/2011 | Jenkins et al. |
| 7,980,378 B2 | 7/2011 | Jones et al. |
| 8,023,715 B2 | 9/2011 | Jones et al. |
| 8,078,518 B2 | 12/2011 | Goertz et al. |
| 8,251,281 B1 | 8/2012 | Eastman et al. |
| 8,556,164 B1 * | 10/2013 | Freedman ............ G06Q 20/387 235/375 |
| 8,630,950 B2 | 1/2014 | Saegert et al. |
| 8,763,897 B1 | 7/2014 | Enright et al. |
| 8,806,275 B1 | 8/2014 | Vannatter et al. |
| 8,922,498 B2 | 12/2014 | Vesely et al. |
| 9,317,745 B2 | 4/2016 | Smith et al. |
| 9,576,278 B2 | 2/2017 | Gromley et al. |
| 10,290,052 B1 | 5/2019 | Quesenberry et al. |
| 10,353,689 B2 | 7/2019 | Mishra et al. |
| 10,395,199 B1 | 8/2019 | Gibson et al. |
| 10,504,123 B2 | 12/2019 | Joao |
| 10,943,441 B1 * | 3/2021 | Watson, III ............ G07D 11/30 |
| 2002/0107800 A1 | 8/2002 | Kadowaki et al. |
| 2004/0056086 A1 | 3/2004 | Mason et al. |
| 2004/0215566 A1 | 10/2004 | Meurer |
| 2006/0086784 A1 | 4/2006 | Burns et al. |
| 2007/0131757 A1 | 6/2007 | Hamilton et al. |
| 2010/0042541 A1 | 2/2010 | Kang et al. |
| 2013/0161385 A1 | 6/2013 | Graef et al. |
| 2013/0247799 A1 | 9/2013 | Furuichi |
| 2014/0054371 A1 | 2/2014 | Turocy et al. |
| 2014/0207673 A1 | 7/2014 | Jeffries et al. |
| 2015/0363755 A1 | 12/2015 | Walden et al. |
| 2015/0379489 A1 | 12/2015 | Gopalakrishnan et al. |
| 2016/0163160 A1 | 6/2016 | Hosokawa et al. |
| 2017/0221295 A1 | 8/2017 | Pont et al. |
| 2019/0259094 A1 | 8/2019 | Quesenberry et al. |

OTHER PUBLICATIONS

Henricks, M.: What to to do When ATMs make a Mistake, Apr. 20, 2012, BankRate, pp. 1-6 (Year: 2012).*

Jonas, James R.: ATM did not dispense cash when withdrawing money—What to do? Nov. 13, 2017, Banking and Bank Products, pp. 1-8 (Year: 2017).*

* cited by examiner

DETECTION OF DISPENSING ERRORS IN AUTOMATED TELLER MACHINES

TECHNICAL FIELD

This disclosure relates generally to error detection. More specifically, this disclosure relates to detection of dispensing errors in automated teller machines.

BACKGROUND

Automated teller machines (ATMs) are used by organizations as a convenient means for providing services to users. Rather than having to visit a physical office location during business hours, a user can visit an ATM and complete a transaction by providing an identifying card to the ATM, entering a pin code to verify his/her identity, and interacting with the ATM using an attached keypad and/or touchscreen. One of the primary services offered by ATMs is cash withdrawal. Users request an amount, and in some cases the desired denominations, of cash to be withdrawn from their account. The ATM then dispenses the cash to the user.

Several problems plague ATMs, which limits their convenience. First, ATMs pass paper currency through various mechanical parts that present an opportunity for jamming. Jamming may be the result of a damaged bill or a buildup of foreign substances in the mechanics of the ATM. Users will not be able to obtain the cash they requested when the ATM experiences jamming. Additionally, ATM function is limited by the accuracy with which the machine is serviced. ATMs are periodically reloaded with currency. Each denomination is loaded into its own cassette. Improperly loading cash into a cassette can cause jamming and prevent users from receiving the cash they requested. There is additional room for error when the cassettes are loaded back into the ATM. Each cassette has its own bay in the ATM. If the cassette is loaded into the wrong bay, a phenomenon known as cross-loading, then the ATM will not distribute the correct denominations when users make withdrawals. This may result in the ATM providing a user with one amount of cash while debiting a different amount of cash from the user's account.

Each of the errors above can make it difficult to accurately track and reconcile ATM transactions. Traditional methods rely on users to not only recognize the error occurred but also to find the right person to contact to report the ATM malfunction. Many users are not willing to go through this much effort. This leads to a long delay in error detection and remediation, which allows the magnitude of the error to grow.

SUMMARY OF THE DISCLOSURE

According to one embodiment, a system for detecting dispensing errors in automated teller machines includes a display and a processor. The display is configured to display questions to a user. In response to a first question displayed on the display, the processor receives a signal indicating that cash dispensed to the user does not match the cash requested by the user. In response to a second question displayed on the display, the processor receives a signal indicating that the amount of cash received by the user did not match the amount of cash the user requested, the denominations received by the user did not match the denominations requested by the user, or both. The processor also generates an error report. The error report includes the information indicated by the received signals. The error report also includes a report identifier and an identifier associated with the user. The processor also generates a receipt for the user. The user receipt includes the report identifier. The processor transmits the error report to a server.

In another embodiment, a method for detecting dispensing errors in automated teller machines includes receiving a signal indicating that cash dispensed to a user does not match the cash requested by the user. This signal is received in response to a first question displayed to the user. The method also includes receiving a signal indicating that the amount of cash received by the user did not match the amount of cash the user requested, the denominations received by the user did not match the denominations requested by the user, or both. This signal is received in response to a second question displayed to the user. The method then involves generating an error report. The error report includes the information indicated by the signals. The error report also includes a report identifier and an identifier associated with the user. The method further includes generating a receipt for the user. The user receipt includes the report identifier. The method also includes transmitting the error report to a server.

Certain embodiments of this disclosure provide unique solutions to the technical problems described above. The disclosed system provides several practical applications and technical advantages which include 1) instant and automatic collection of error reports from ATM users at the site of the ATM; 2) the ability to identify ATMs that are experiencing dispensing errors based on comparisons between the rate of incoming error reports and baseline levels expected from an ATM under normal operating conditions; 3) the ability to automatically rectify ATM dispensing errors with respect to the user's account balance; and 4) remote initiation of ATM repairs based on automated detection of dispensing errors. The methods employed by this system increase the speed and accuracy of detecting when an ATM fails to dispense the correct amount of cash. In turn, quick and accurate detection of ATM malfunctions increases the availability of teller services to users of ATMs. Additionally, the improved accuracy of the disclosed process will prevent entities from deploying technicians on unnecessary service calls when the ATM is not actually malfunctioning.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of the present disclosure, reference is now made to the following description, taken in conjunction with the accompanying drawings and detailed description, wherein like reference numerals represent like parts.

DETAILED DESCRIPTION

System Overview

Figure 1:
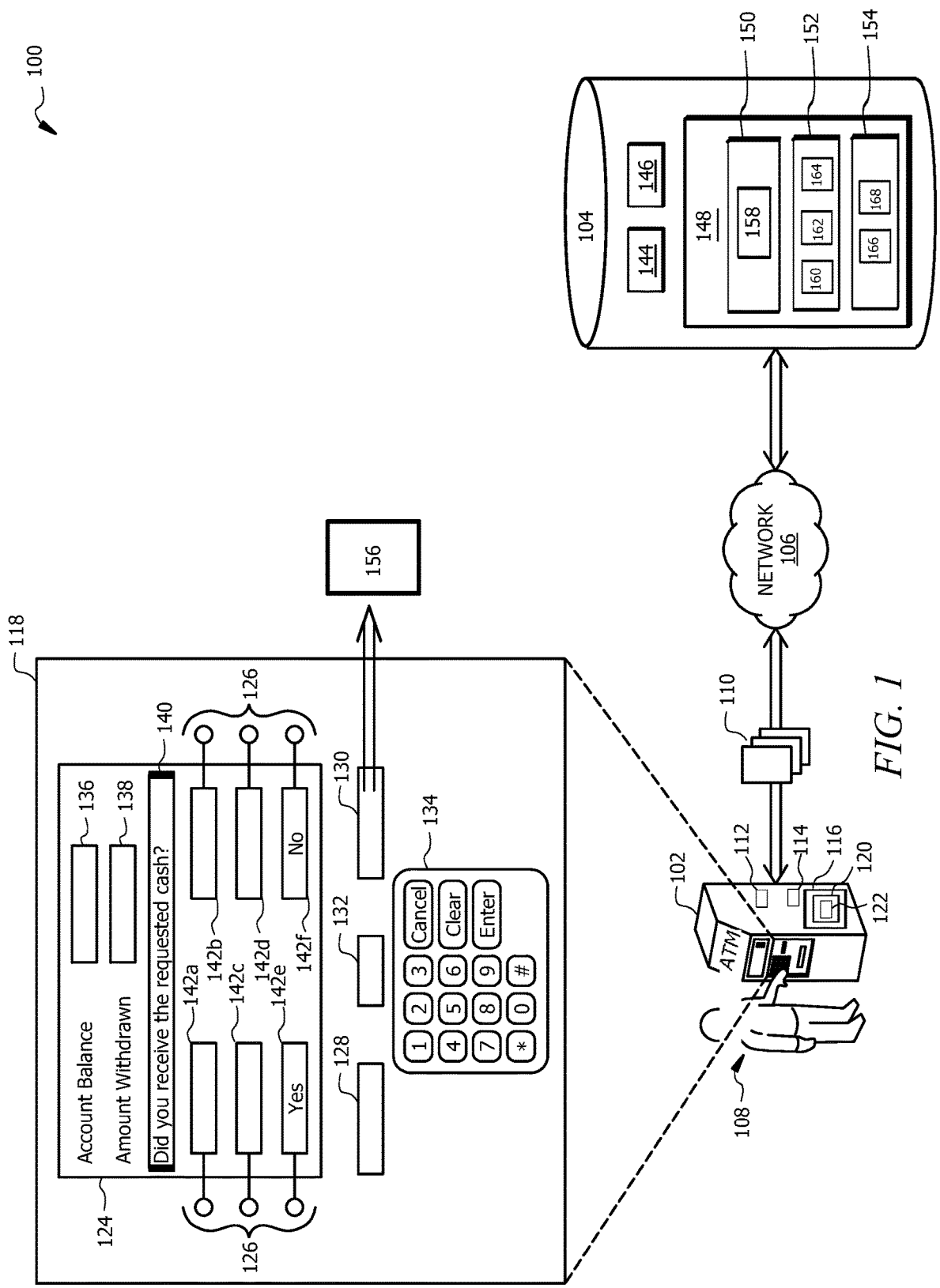
FIG. 1 is a schematic diagram of an example system for detecting dispensing errors in automated teller machines.

FIG. 1 is a schematic diagram of an example system 100 for detecting dispensing errors in an automated teller machine (ATM) 102. In one embodiment, the system 100 comprises an ATM 102 and an error resolution server 104. The ATM 102 and error resolution server 104 are in signal communication through network 106. In some embodiments, ATM 102 and error resolution server 104 may communicate with devices controlled by user 108. For example, user 108 may have a mobile phone, a personal computer, a digital assistant, or any similar digital device capable of sending and receiving data from either ATM 102 or error resolution server 104 through network 106. In general, [explain high level operation of system so reader gets a preview of the invention]

Network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art.

ATM

ATM 102 is an automated teller machine that allows users to withdraw cash, check balances, and/or make deposits interactively using, for example, a magnetically encoded card, to perform transactions. ATM 102 is generally configured to facilitate transactions between a user 108 and an institution that controls the error resolution server 104. ATM 102 may dispense cash to user 108. Embodiments of the present invention allow the ATM 102 to detect dispensing errors and send one or more error reports 110 to error resolution server 104 through network 106. Additional detail about the error reports 110 is provided in FIG. 2. ATM 102 comprises a network interface 112, processor 114, memory 116, and user interface 118. The network interface 112 is configured to enable wired and/or wireless communications. The network interface 112 is configured to communicate data between the ATM 102 and other devices (e.g. error resolution server 104), systems, or domains. For example, the network interface 112 may comprise a WIFI interface, a LAN interface, a WAN interface, a modem, a switch, or a router. The processor 114 is configured to send and receive data using the network interface 112. The network interface 112 may be configured to use any suitable type of communication protocol as would be appreciated by one of ordinary skill in the art.

The processor 114 comprises one or more processors operably coupled to the memory 116. The processor 114 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 114 may be a programmable logic device, a microcontroller, a microprocessor, or any suitable combination of the preceding. The processor 114 is communicatively coupled to and in signal communication with the memory 116. The one or more processors are configured to process data and may be implemented in hardware or software. For example, the processor 114 may be 8-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various software instructions. For example, the one or more processors are configured to execute software instructions 122 to implement an error reporting engine 120. In this way, processor 114 may be a special-purpose computer designed to implement the functions disclosed herein. In an embodiment, the error reporting engine 120 is implemented using logic units, FPGAs, ASICs, DSPs, or any other suitable hardware. The error reporting engine 120 is configured to operate as described in FIG. 3. For example, the error reporting engine 120 may be configured to perform steps 302-312 of method 300 as described in FIG. 3.

The memory 116 comprises one or more disks, tape drives, or solid-state drives, and may be used as an over-flow data storage device, to store programs when such programs are selected for execution, and to store instructions and data that are read during program execution. The memory 116 may be volatile or non-volatile and may comprise read-only memory (ROM), random-access memory (RAM), ternary content-addressable memory (TCAM), dynamic random-access memory (DRAM), and static random-access memory (SRAM). The memory 116 is operable to store error reporting engine 120. The error reporting engine 120 comprises any suitable set of software instructions 122, logic, rules, or code operable to execute one or more of the steps detailed in FIG. 3.

The user interface 118 comprises a display 124, a plurality of user inputs 126, a card receiver 128, a receipt printer 130, a cash dispenser 132, and a keypad 134. The display 124 is configured to display information to the user 108 and solicit information from user 108. For example, the display 124 may be configured to display an account balance field 136, an amount withdrawn field 138, a question field 140, and a plurality of user response fields 142a-f. The account balance field 136 may display the amount of money in an account associated with user 108. The account balance field 136 may also specify the type of account (e.g., savings or checking). The amount withdrawn field 138 may show the amount of money requested by user 108. In some embodiments, the amount withdrawn field 138 may also display the currency denominations of the cash requested by user 108.

The question field 140 may be used to display a variety of questions to the user 108. For example, the question field 140 may ask the user 108 if the user 108 received the correct amount of cash that was requested. Follow-up questions may be posed to the user 108 in question field 140. For example, the question field 140 may ask the user 108 whether the amount of cash received was not the amount requested, the cash received was not in the denomination(s) requested, or both. The question field 140 may also be used to ask the user 108 how much cash was received, so that the system 100 can determine the difference between the amount of cash requested by user 108 and the amount of cash received by user 108. Other questions may be posed to the user 108 using question field 140. Those of ordinary skill in the art will appreciate that the questions in question field 140 may be posed in different ways to elicit the relevant responses from the user 108.

The display 124 may configured to display a plurality of user response fields 142a-f. The response fields 142 may be configured as optional responses to the question or questions posed in question field 140. In the example of FIG. 1, the question field 140 asks user 108 whether he received the requested cash. The response field 142e is configured to serve as a "Yes" answer and response field 142f is configured to serve as a "No" answer. The responses in response fields 142e-f are selected using the corresponding user input 126. The user input 126 may be a mechanical button located adjacent to the display 124 that user 108 depresses to select the corresponding response field 142. In alternate embodiments, the user input 126 may be a virtual button when display 124 is a touchscreen.

Figure 2A:
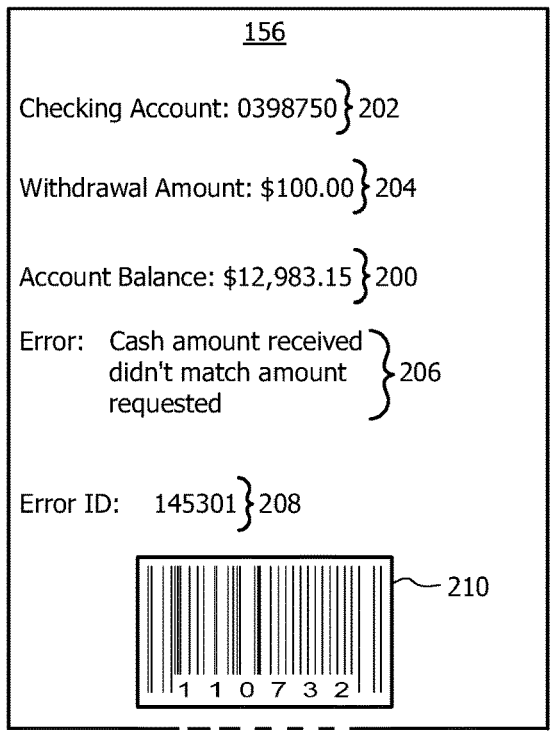
FIG. 2a illustrates one embodiment of a user receipt produced by the example system of FIG. 1.

The card receiver 128 is configured to receive a debit or credit card. User 108 inputs their card into the card receiver 128 to access their account. The receipt printer 130 is configured to print a user receipt 156 on paper. An example receipt 156 is illustrated in FIG. 2a. The user receipt 156 may display the account balance 200 of one or more accounts 202 associated with user 108. The user receipt may also indicate an amount withdrawn 204 by the user 108. The user receipt 156 may also include an error indicator 206 that summarizes the error reported by the user 108. The user receipt 156 may optionally display the date, time, and location of a transaction conducted by the user 108. When user 108 reports an error with the function of ATM 102, the user receipt may include an error report identifier 208 so that user 108 may track the progress of the investigation into the error reported by user 108. The status of the investigation may include information on both the dispensing error experienced at the ATM 102 and information on whether any adjustments will be made to the balance of the account involved in the transaction.

The user receipt 156 may also include a barcode 210 that user 108 may scan to obtain information about the investigation into the error. For example, scanning the barcode 210 may take the user 108 to a website that displays the investigation status. The barcode 210 may alternatively provide a link to a mobile application where the user 108 can check the status of the investigation. The barcode 210 may be a linear (1D) barcode or a 2D barcode.

Returning to FIG. 1, alternate embodiments of ATM 102 may send user 108 a digital version of receipt 156 in place of, or in addition to, printing a physical receipt 156. The digital receipt 156 may be sent to a mobile phone, a personal computer, a laptop, a tablet, or any other device capable of sending and receiving communications over network 106. The digital receipt 156 may be sent via email, sms, or similar means. Alternatively, the digital receipt 156 may be displayed to user 108 in a mobile application hosted by the entity operating the ATM 102. Any of the information described as capable of inclusion on receipts printed by receipt printer 130 may be included in a digital receipt sent to user 108.

Cash dispenser 132 is an opening of enough size to dispense currency from ATM 102. The cash dispenser 132 should be large enough to dispense the widest bill circulated in the country in which ATM 102 is located. The cash dispenser 132 may be fed from a plurality of different cassettes stored within ATM 102. Each cassette stored in ATM 102 is configured to store a different denomination of currency. Keypad 134 is configured to receive a variety of inputs from user 108. For example, the keypad 134 may be configured with a plurality of numerals that user 108 can use to input a Personal Identification Number (PIN) in order to securely access an account. The buttons on keypad 134 may be configured to receive several commands from user 108. For example, the keypad 134 might include a "cancel" button that cancels a transaction process that started when the user 108 entered a PIN. Those of ordinary skill in the art will appreciate that keypad 134 can incorporate a number of command keys, and can be configured using several different designs.

Error Resolution Server

When a user 108 reports an error at ATM 102, an error report 110 is generated by the ATM 102 and transmitted to error resolution server 104. The error report 110 is discussed in more detail in FIG. 2b. The error resolution server 104 comprises a network interface 144, a processor 146, and a memory 148. The network interface 144 is configured to enable wired and/or wireless communications. The network interface 144 is configured to communicate data between the error resolution server 104 and other devices (e.g. ATM 102), systems, or domains. For example, the network interface 144 may comprise a WIFI interface, a LAN interface, a WAN interface, a modem, a switch, or a router. The processor 146 is configured to send and receive data using the network interface 144. The network interface 144 may be configured to use any suitable type of communication protocol as would be appreciated by one of ordinary skill in the art.

Processor 146 comprises one or more processors operably coupled to the memory 148. The processor 146 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 146 may be a programmable logic device, a microcontroller, a microprocessor, or any suitable combination of the preceding. The processor 146 is communicatively coupled to and in signal communication with the memory 148. The one or more processors are configured to process data and may be implemented in hardware or software. For example, the processor 146 may be 8-bit, 16-bit, 32-bit, 64-bit or of any other suitable architecture. The processor 146 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions 158 to implement an exception engine 150. In this way, processor 146 may be a special-purpose computer designed to implement the functions disclosed herein. In an embodiment, the exception engine 150 is implemented using logic units, FPGAs, ASICs, DSPs, or any other suitable hardware. The exception engine 150 is configured to operate as described in FIG. 3. For example, the exception engine 150 may be configured to perform steps 314-324 of method 300 as described in FIG. 3.

The memory 148 comprises one or more disks, tape drives, or solid-state drives, and may be used as an over-flow data storage device, to store programs when such programs are selected for execution, and to store instructions and data that are read during program execution. The memory 148 may be volatile or non-volatile and may comprise read-only memory (ROM), random-access memory (RAM), ternary content-addressable memory (TCAM), dynamic random-access memory (DRAM), and static random-access memory (SRAM). The memory 148 is operable to store exception engine 150, a database of user accounts 152, and a database of ATM error counts 154. The exception engine 150 may detect ATMs 102 that need repair by analyzing patterns in the error reports 110 generated from an ATM 102. The exception engine 150 comprises any suitable set of instructions 158, logic, rules, or code operable to execute one or more of the steps detailed in FIG. 3.

The database of user accounts 152 comprises a list of accounts 160 associated with each user 108. The records in the database 152 may be searched based on an identifier associated with each user 108. Some users 108 may only have an associated checking account. Other users 108 may also have an associated savings account. Still other users 108 may be associated with more than two accounts. The database of user accounts 152 includes a balance of money for each account. The database of user accounts 152 may also include, for each user 108, a count 162 of error reports that were created by the user 108. The count of error reports created by the user 108 may additionally include an indication 164 of how frequent the error reports have been generated. The count of error reports is updated in the database of user accounts 152 each time the error resolution server 104 receives an error report 110. It may also include a list of identifiers associated with the ATMs 102 from which user 108 generated each error report 110. Additional detail regarding the role of the database of user accounts 152 is provided in the discussion of FIG. 3.

The database of ATM error counts 154 comprises a list 166 of the ATMs 102 associated with the entity that controls the error resolution server 104. The database of ATM error counts 154 also keeps a running total 168 of the quantity of error reports 110 generated at each ATM 102. Each time an error report 110 is received, the running total 168 of the quantity of error reports 110 generated at the ATM 102 is increased by one. This database may also include an indication of the date and time when each error report 110 was generated.

Dispensing Error Detection

Figure 3:
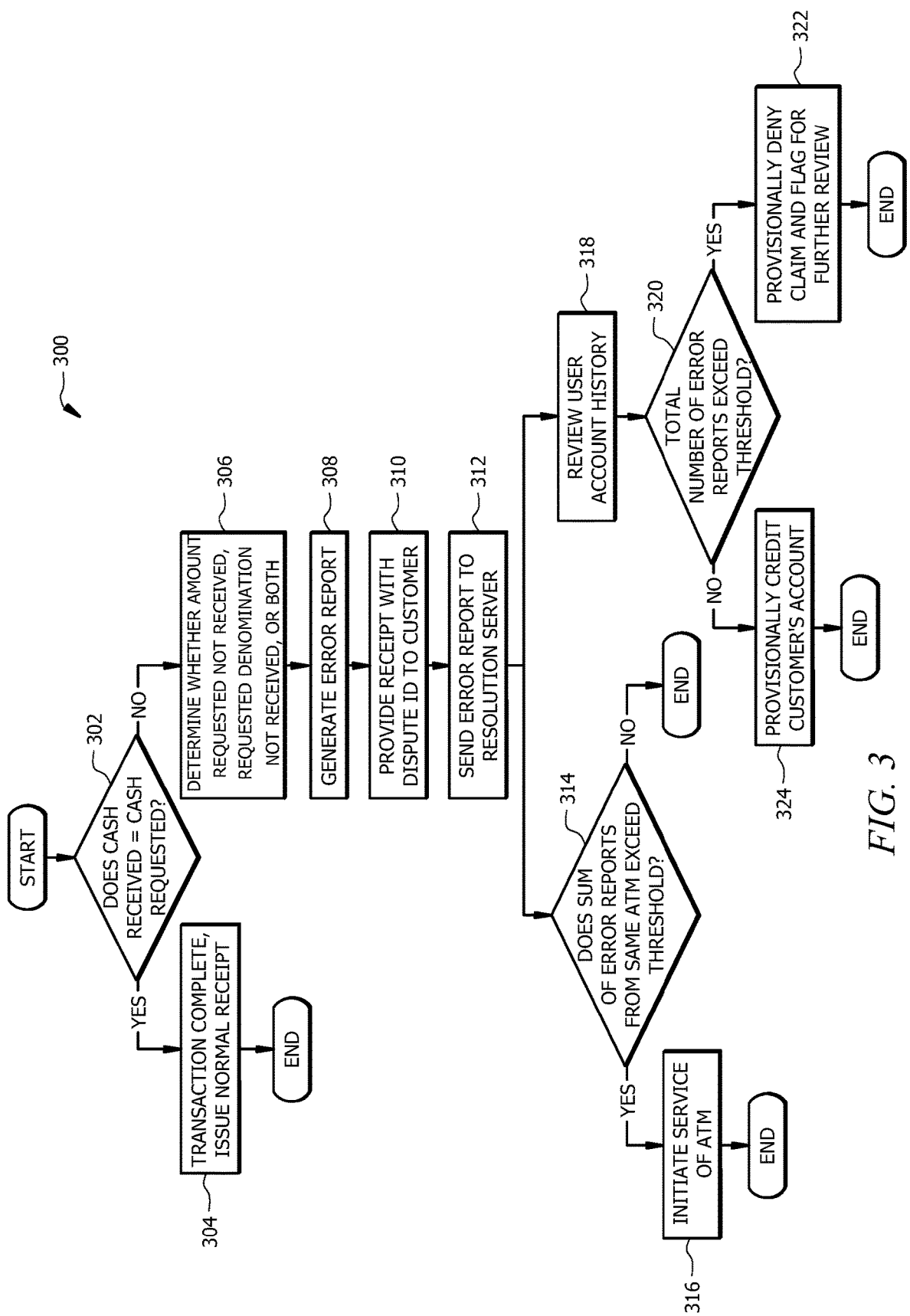
FIG. 3 is a flowchart of an embodiment of a method for detecting dispensing errors in automated teller machines.

FIG. 3 is a flowchart of an embodiment of a method 300 for detecting dispensing errors in automated teller machines, such as ATM 102. Starting at step 302, one or more questions are posed to the user 108 on display 124 by the error reporting engine 120 to determine whether user 108 received cash matching the cash requested. The example system 100 of FIG. 1 accomplishes this step by displaying the question "Did you receive the requested cash?" in the question field 140. If the user 108 provides an affirmative answer, then the transaction is complete and the ATM 102 issues a normal receipt at step 304. User 108 may provide an affirmative answer by pressing the user input 126 that is associated with the response field 142e. If, however, the user 108 provides a negative answer by pressing the user input 126 that is associated with the response field 142f, then the method proceeds to step 306. The error reporting engine 120 will pose additional questions in the question field 140 at step 306 to determine whether the amount of cash received did not match the amount of cash requested by user 108, the denominations received did not match the denominations requested by the user 108, or both. If the user indicates that the amount of cash received did not match the amount of cash requested, then the error reporting engine 120 may display a question in the question field 140 asking the user how much cash was received. If the user indicates that the denominations received did not match the denominations requested, then the error reporting engine 120 may display a question in the question field 140 asking the user which denominations were received.

One of ordinary skill in the art will appreciate that the questions posed to elicit this information may be phrased in various ways. The response fields 142 may be configured as necessary to provide optional responses for the user 108. The user 108 may select from each of the response fields 142a-f to indicate a response by pressing the associated user input 126.

Figure 2B:
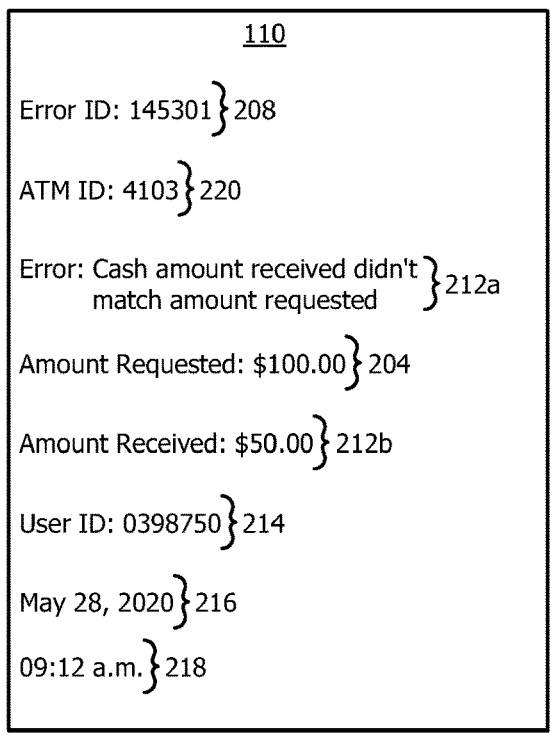
FIG. 2b illustrates one embodiment of an error report produced by the example system of FIG. 1.

After a signal from user 108 indicating that the amount of cash received did not match the amount of cash requested by user 108, the denominations received did not match the denominations requested by the user 108, or both, the error reporting engine 120 generates an error report 110 at step 308. An example error report 110 is illustrated in FIG. 2b. Each error report 110 is associated with an error report identifier 208 that is used to track the progress of the error investigation conducted by the entity controlling the error resolution server 104. This error report identifier 208 is the same one that is included in the corresponding user receipt 156. The error report 110 also includes the information 212 indicated in the signal generated by user 108 in response to the question or questions posed at step 306. In the example of FIG. 2b, the user 108 gave, in response to one of the questions posed in question field 140, a first indication 212a that the amount of cash received by user 108 did not match the amount of cash requested. The user 108 further provided indication 212b, in response to another of the questions posed in question field 140, that the amount of cash received was $50. The error report 110 may also include withdrawal amount 204 that represents the amount of cash requested by the user 108.

Additionally, the error report 110 includes an identifier 214 that is associated with the user 108. User identifier 214 is the user's account number 0398750 in the example of FIG. 2b; however, the user identifier 214 may be a separate identifier that does not specifically reference any of the user's accounts. In some embodiments, the error report 110 further provides the date 216 and time 218 when the error report 110 was created. The error report 110 may also include a unique identifier 220 that is associated with the ATM 102. This allows the entity controlling the error resolution server 104 to determine which ATM needs repair. This also enables the entity controlling the error resolution server 104 to identify and review surveillance footage of the ATM 102 to determine if the ATM 102 is the subject of physical tampering.

After generating the error report 110, the error reporting engine 120 proceeds to step 310 where it provides a receipt to the user 108. The receipt generally includes the report identifier. The receipt may be printed using receipt printer 130. Paper receipts may include a scannable barcode that directs the user 108 to a web portal where the user 108 can track the review progress of the reported error. The user 108 may alternatively elect to receive digital receipts. The user 108 can opt into receiving digital receipts in advance of using the ATM 102, or the question field 140 and response fields 142 can be configured to ask the user 108 if the user 108 prefers a paper of a digital receipt. The receipt may also include an indication of the balance in the accounts associated with user 108 along with an indication of the amount of money withdrawn in the transaction that generated the receipt.

The reporting engine 120 sends the error report 110 to the error resolution server 104 at step 312. While illustrated as occurring sequentially after step 310, step 312 may occur at the same time as step 310, and even before step 310 in some cases. The error report 110 is transmitted over network 106. Further processing of the error report 110 occurs at the error resolution server 104.

Steps 314-324 represent two operational branches enabled by exception engine 150. The branch starting at step 314 relates to correcting the physical malfunction at the ATM 102 and the branch starting at step 318 relates to correcting the error with user 108. Error resolution server 104 may pursue one or both branches after receiving an error report 110 from ATM 102. At step 314, the exception engine 150 determines whether the total number of error reports 110 received over a period of time from the same ATM 102 exceeds a threshold. For example, the operator of the error resolution server 104 may set the threshold at 5 errors in a period of 12 hours. The number of errors and the time period for consideration of this threshold is configurable by the operator of error resolution server 104. A higher volume and/or frequency of error reports coming from an ATM 102 indicate that there may be a malfunction in the dispensing mechanics of the ATM 102.

The exception engine 150 can update the ATM error counts 154 each time a new error report 110 is received. The new ATM error count 154 for the ATM 102 is then used in the threshold determination. For example, consider an error resolution server 104 where the operator of the error resolution server 104 configures the threshold to be 10 reports in a 48-hour period. Assume also that there is an ATM 102 with an error count 154 of 10 during the previous 48 hours. When a user 108 reports another error from ATM 102, the error count 154 will be increased to 11.

Further action is unnecessary, and this branch of analysis comes to an end if the threshold is not exceeded. If the threshold is exceeded, then the exception engine 150 proceeds to step 316 and initiates service of the ATM 102. Step 316 comprises disabling the malfunctioning ATM 102. In some embodiments, step 316 further comprises sending an alert message to a designated individual to inform them that the ATM 102 needs repair.

The other operational branch enabled by exception engine 150 starts at step 318 where the exception engine 150 reviews the account history of the user 108. The exception engine 150 compares the user identifier included in the error report 110 with the list of user identifiers in the database of user accounts 152. The user account associated with a matching user identifier is then reviewed by the exception engine 150 for indicators of abnormal behavior. For example, at step 320 the exception engine 150 compares the total number of error reports 110 received from the user 108 during a period to a threshold. A user 108 that repeatedly generates error reports 110 from one or more ATMs 102 may be engaging in fraudulent behavior rather than reporting a legitimate malfunction of the ATM 102. Thus, error reports 110 that are the result of prolific reporting may be discounted or ignored when assessing whether the ATM 102 is malfunctioning. Establishing a threshold number for how many reports an average user might generate over a time period allows the error resolution server 104 to filter out such fraudulent reports.

The period to be reviewed may be determined by the entity controlling the error resolution server 104. For example, the period for review may be set to the previous 30 days. Alternatively, the period for review may be set to a period of months or years. The threshold may also be determined by the entity controlling the error resolution server 104. If the threshold is exceeded, then the exception engine 150 provisionally denies the claim from user 108 at step 322. The current account balance stored in the data base of user accounts 152 remains unchanged, and the error report 110 gets flagged for further review.

If, instead, the threshold is not exceeded at step 320, then the report 110 is more likely to be a genuine report of a malfunction. The error resolution server 104 is configured to rectify the error as it affects user 108. For example, the exception engine 150 is configured to provisionally credit the account balance of user 108 at step 324 in an amount that is the difference between the amount of cash requested by user 108 at ATM 102 and the amount of cash received from the ATM 102. Any of the provisional decisions made by exception engine 150 may be made permanent after the ATM transactions are reconciled.

While the FIG. 3 illustrates analyzing the number of reports made by user 108 as part of reviewing the user's account history at step 318, other elements of a user account may be analyzed. For example, the exception engine 150 may make determinations on whether to credit the user's account balance based on the length of the relationship between user 108 and the entity controlling error correction server 104, the value of the accounts user 108 holds with the entity controlling error correction server 104, and the types of services the entity controlling error correction server 104 provides to user 108. Decisions may also be made on any combination of these, or similar, factors.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for detecting dispensing errors in automated teller machines, comprising:
a display of an automated teller machine, configured to display one or more questions to a user; a hardware processor communicatively coupled to the display, and configured to:
receive a first signal, in response to a first question displayed on the display, indicating that dispensed cash does not match requested cash;
receive a second signal, in response to a second question displayed on the display, indicating that a received amount of cash did not match a requested amount of cash, received currency denominations did not match requested currency denominations, or both;
generate an error report comprising the information indicated by the first and second signals, a report identifier, and an identifier associated with the user;
generate a user receipt comprising the report identifier; and
transmit the error report to a server over a network;
wherein:
the information indicated by the second signal is that the received amount of cash did not match the requested amount of cash; and
the server comprises:
a memory configured to store an account associated with the user, comprising:
a number representing the total quantity of error reports initiated by the user; and
a balance of money;
a second hardware processor communicatively coupled to the memory, configured to:
determine that the number representing the total quantity of error reports initiated by the user does not exceed a threshold;
provisionally credit the balance with an amount that is the difference between the amount of cash requested and the amount of cash received.

2. The system of claim 1, the error report further comprising the date the error report was generated, the time the error report was generated, and an identifier associated with the automated teller machine from which cash was dispensed.

3. The system of claim 1, the user receipt further comprising a barcode associated with the error report, the barcode configured to provide information about the status of an investigation into the reported error.

4. The system of claim 1, wherein the user receipt is a digital receipt capable of being displayed on a mobile phone, a personal computer, a laptop, or a tablet.

5. The system of claim 1, wherein:
the information indicated by the second signal is that the received amount of cash did not match the requested amount of cash; and
the server comprises:
a memory configured to store a number representing the total quantity of error reports initiated by the user;
a second hardware processor communicatively coupled to the memory, configured to:
determine that the number representing the total quantity of error reports initiated by the user exceeds a threshold;
provide the user with a message that the user's account balance will remain unaltered.

6. The system of claim 5, the second hardware processor further configured to flag the error report for further review.

7. The system of claim 2, the server comprising:
a memory configured to store a count of the number of previously received error reports associated with the automated teller machine;
a second hardware processor communicatively coupled to the memory, configured to:
use the identifier in the error report associated with the automated teller machine to find the count of previously received error reports stored in the memory;
increase the count of previously received error reports stored in the memory by one to generate a new count of received error reports;
determine that the new count of error reports exceeds a threshold;
disable the automated teller machine; and
flag the automated teller machine for repairs.

8. A method for detecting dispensing errors in automated teller machines, comprising:
receiving a first signal, by a hardware processor, in response to a first question displayed to a user on a display, indicating that dispensed cash does not match requested cash;
receiving a second signal, by the hardware processor, in response to a second question displayed to the user on the display, indicating that a received amount of cash did not match a requested amount of cash, received denominations did not match requested denominations, or both;
generating, by the hardware processor, an error report comprising the information indicated by the first and second signals, a report identifier, and an identifier associated with the user;
generating, by the hardware processor, a user receipt comprising the report identifier, and transmitting, by the hardware processor, the error report to a server over a network;
wherein:
the information indicated in response to the second question displayed on the display is that the received amount of cash did not match the requested amount of cash; and
the method further comprising:
determining by the server that a number, stored on the server, representing the total quantity of error reports initiated by the user does not exceed a threshold;
provisionally crediting by the server a balance, stored on the server, with an amount that is the difference between the amount of cash requested and the amount of cash received.

9. The method of claim 8, the user receipt further comprising a barcode associated with the error report, the barcode configured to provide information about the status of an investigation into the reported error.

10. The method of claim 8, wherein the user receipt is a digital receipt capable of being displayed on a mobile phone, a personal computer, a laptop, or a tablet.

11. The method of claim 8, wherein:
the information indicated by the second signal is that the received amount of cash did not match the requested amount of cash;
the server comprises a memory configured to store a number representing the total quantity of error reports initiated by the user; and
the method further comprising:
determining that the number representing the total quantity of error reports initiated by the user exceeds a threshold;
providing the user with a message that the user's account balance will remain unaltered.

12. The method of claim 11, the method further comprising flagging the error report for further review.

13. The method of claim 8, the error report further comprising the date the 20 error report was generated, the time the error report was generated, and an identifier associated with the automated teller machine from which cash was dispensed.

14. The method of claim 13, the method further comprising:
- using the identifier in the error report associated with the automated teller machine to find, on the server, a count of previously received error reports;
- increasing the count of previously received error reports stored on the server by one to generate a new count of received error reports;
- determining that the new count of error reports exceeds a threshold;
- disabling the automated teller machine; and
- flagging the automated teller machine for repairs.

15. A computer program comprising executable instructions stored in a non-transitory computer readable medium that when executed by a processor causes the processor to:
- cause to be displayed to a user a first question on a display of an automated teller machine;
- receive a first signal from the user in response to the first question, indicating that cash dispensed from an automated teller machine does not match cash requested from the automated teller machine;
- cause to be displayed to a user a second question on the display of an automated teller machine;
- receive a second signal from the user in response to the second question, indicating that an amount of cash received from the automated teller machine did not match an amount of cash requested at the automated teller machine, denominations received from the automated teller machine did not match denominations requested from the automated teller machine, or both;
- generate an error report comprising the information indicated by the first and second signals, a report identifier, and an identifier associated with the user; generate a user receipt comprising the report identifier; and
- transmit the error report to a server over a network;

wherein:
- the information indicated in response to the second question displayed on the display is that the received amount of cash did not match the requested amount of cash; and
- the instruction when executed by a processor of the server causes the processor to:
  - determining by the server that a number, stored on the server, representing the total quantity of error reports initiated by the user does not exceed a threshold;
  - provisionally crediting by the server a balance, stored on the server, with an amount that is the difference between the amount of cash requested and the amount of cash received.

16. The computer program of claim 15, the error report further comprising the date the error report was generated, the time the error report was generated, and an identifier associated with the automated teller machine from which cash was dispensed.

17. The computer program of claim 15, the user receipt further comprising a barcode associated with the error report, the barcode configured to provide information about the status of an investigation into the reported error.

18. The computer program of claim 15, wherein the user receipt is a digital receipt capable of being displayed on a mobile phone, a personal computer, a laptop, or a tablet.

* * * * *